(12) United States Patent
Sato et al.

(10) Patent No.: US 11,755,109 B2
(45) Date of Patent: Sep. 12, 2023

(54) INFORMATION PROCESSING APPARATUS AND NON-TRANSITORY COMPUTER READABLE MEDIUM STORING PROGRAM

(71) Applicant: Agama-X Co., Ltd., Tokyo (JP)

(72) Inventors: Masahiro Sato, Kanagawa (JP); Kengo Tokuchi, Kanagawa (JP)

(73) Assignee: Agama-X Co., Ltd., Tokyo (JP)

( * ) Notice: Subject to any disclaimer, the term of this patent is extended or adjusted under 35 U.S.C. 154(b) by 518 days.

(21) Appl. No.: 16/780,911

(22) Filed: Feb. 4, 2020

(65) Prior Publication Data

US 2021/0072828 A1 Mar. 11, 2021

(30) Foreign Application Priority Data

Sep. 6, 2019 (JP) .................. 2019-163300

(51) Int. Cl.
  *G06F 3/01* (2006.01)
  *H04L 12/28* (2006.01)
  *G06F 1/16* (2006.01)

(52) U.S. Cl.
  CPC .............. *G06F 3/015* (2013.01); *G06F 1/163* (2013.01); *H04L 12/282* (2013.01); *H04L 12/2823* (2013.01)

(58) Field of Classification Search
  CPC ....... G06F 3/015; G06F 1/163; H04L 12/282; H04L 12/2823; F24F 11/74; F24F 11/80
  See application file for complete search history.

(56) References Cited

U.S. PATENT DOCUMENTS

| 2009/0138805 A1* | 5/2009 | Hildreth | H04N 21/4751 715/745 |
| 2014/0207292 A1* | 7/2014 | Ramagem | G05D 23/1902 700/278 |
| 2019/0018488 A1* | 1/2019 | Le | G06F 3/015 |

FOREIGN PATENT DOCUMENTS

| JP | 2009-056075 | 3/2009 |
| JP | 2012-068020 | 4/2012 |
| JP | 2015-211705 | 11/2015 |
| JP | 2016-067922 | 5/2016 |
| JP | 6067808 | 1/2017 |
| JP | 2017-062060 | 3/2017 |
| JP | 2017-108259 | 6/2017 |
| JP | 6340528 | 6/2018 |

OTHER PUBLICATIONS

Notice of Reason for Rejection dated Jan. 31, 2023 From the Japan Patent Office Re. Application No. 2021-573431.and its Translation Into English. (6 Pages).

* cited by examiner

*Primary Examiner* — Grant Sitta

(57) ABSTRACT

An information processing apparatus includes a processor configured to receive biopotential information of each of a plurality of users, and transmit, to a device, operation information indicating operation content determined by comparing the operation contents of the device, the operation contents being recognized from the biopotential information of the plurality of users.

20 Claims, 5 Drawing Sheets

| ID | REFERENCE BRAIN WAVE | OPERATION CONTENT | USER |
|---|---|---|---|
| 1 | ⌒ | TURN ON COOLING OF AIR CONDITIONER | USER A |
| 2 | ⌒ | TURN ON COOLING OF AIR CONDITIONER | USER B |
| 3 | ⌒ | TURN OFF COOLING OF AIR CONDITIONER | USER A |
| ... | ... | ... | ... |

FIG. 4

| ID | REFERENCE BRAIN WAVE | OPERATION CONTENT |
|---|---|---|
| 1 | ⌒ | TURN ON COOLING OF AIR CONDITIONER |
| 2 | ⌒ | TURN OFF COOLING OF AIR CONDITIONER |
| ... | ... | ... |

FIG. 5

| ID | REFERENCE BRAIN WAVE | OPERATION CONTENT | USER |
|---|---|---|---|
| 1 | ～ | TURN ON COOLING OF AIR CONDITIONER | USER A |
| 2 | ～ | TURN ON COOLING OF AIR CONDITIONER | USER B |
| 3 | ～ | TURN OFF COOLING OF AIR CONDITIONER | USER A |
| ... | ... | ... | ... |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-163300 filed Sep. 6, 2019.

BACKGROUND

(i) Technical Field

The present invention relates to an information processing apparatus and a non-transitory computer readable medium storing a program.

(ii) Related Art

It is conceivable to operate a device using biological information such as brain waves.

JP2015-211705A describes an apparatus that detects an brain wave signal from user's brain waves, detects a surface myoelectric biological signal from the user's surface myoelectric potential, and calculates a control signal based on both biological signals.

JP2016-067922A describes a device that acquires user's brain waves, and selectively operates a plurality of operation devices according to an analysis result obtained by analyzing the brain waves.

SUMMARY

However, in a case where one device is used by a plurality of users, it may not be specified whose operation is to be reflected on the device.

Aspects of non-limiting embodiments of the present disclosure relate to an information processing apparatus and a non-transitory computer readable medium storing a program, which allow a device to be appropriately operated even in a case where operation instructions are given to the device by a plurality of users.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive biopotential information of each of a plurality of users, and transmit, to a device, operation information indicating operation content determined by comparing the operation contents of the device, the operation contents being recognized from the biopotential information of the plurality of users.

BRIEF DESCRIPTION OF THE DRAWINGS

Exemplary embodiment(s) of the present invention will be described in detail based on the following figures, wherein:

FIG. 4 is a diagram illustrating a management table; and

FIG. 5 is a diagram illustrating a management table.

DETAILED DESCRIPTION

Figure 1:
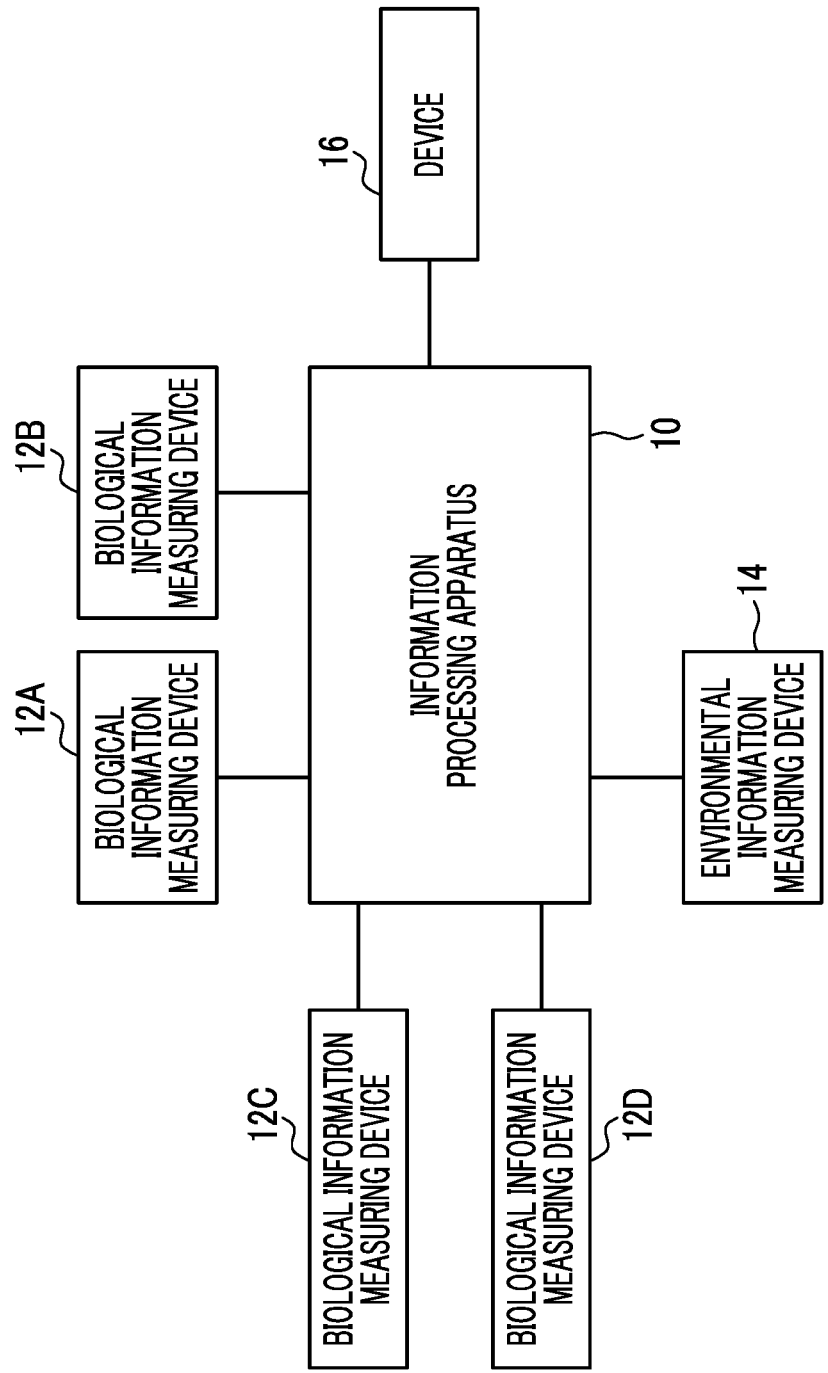
FIG. 1 is a block diagram illustrating a configuration of an information processing system according to the present exemplary embodiment.
Figure 2:
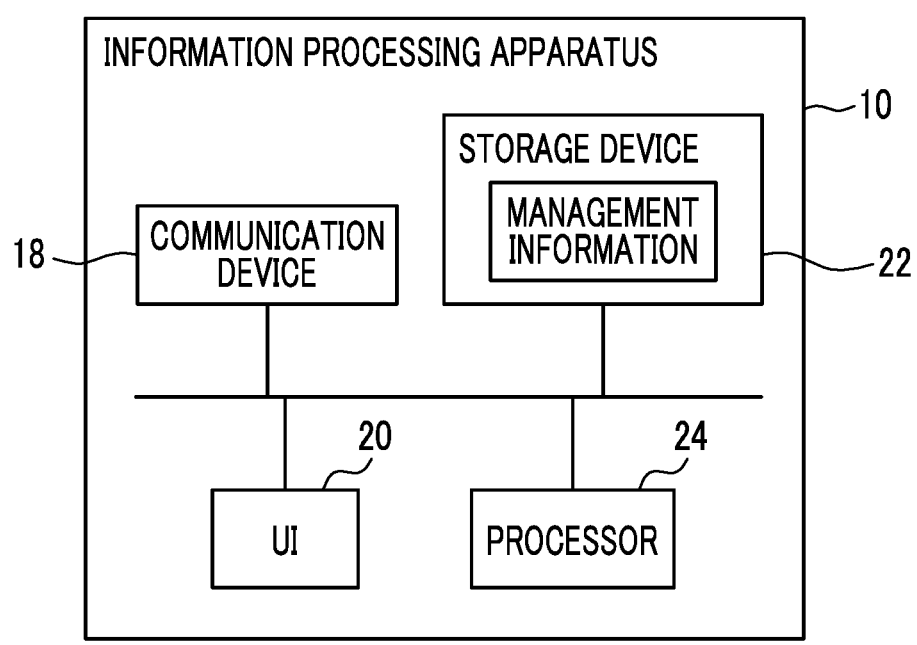
FIG. 2 is a block diagram illustrating a configuration of an information processing apparatus according to the present exemplary embodiment.

An information processing system according to the present exemplary embodiment will be described with reference to FIG. 1. FIG. 1 illustrates an example of the configuration of the information processing system according to the present exemplary embodiment.

The information processing system according to the present exemplary embodiment includes an information processing apparatus 10, a plurality of biological information measuring devices, one or a plurality of environment information measuring devices 14, and one or a plurality of devices 16. In the example shown in FIG. 1, the information processing system includes biological information measuring devices 12A, 12B, 12C, and 12D, but this is only an example. Hereinafter, in a case where it is not necessary to distinguish between the biological information measuring devices 12A, 12E, 12C, and 12D, the biological information measuring devices 12A, 12B, 12C, and 12D are referred to as "biological information measuring device 12". The number of devices shown in FIG. 1 is only an example, and the number of devices is not limited to the number of devices shown in FIG. 1. The information processing system may include other devices (for example, external devices such as servers) other than the devices shown in FIG. 1.

The information processing apparatus 10, the biological information measuring device 12, the environment information measuring device 14, and the device 16 are configured to communicate with other devices, and the like. The communication may be wired communication using a cable, or wireless communication. That is, each device may be physically connected to another device, or the like by a cable to may transmit and receive information to and from each other, or may transmit and receive information to and from each other by wireless communication. For example, near field communication, Wi-Fi (registered trademark), or the like is used as the wireless communication. Wireless communication of standards other than these may be used. Near field communication is, for example, Bluetooth (registered trademark), radio frequency identifier (RFID), NFC, or the like. Each device may communicate with another device, another sensor, or the like through a communication path such as a local area network (LAN) or the Internet.

The information processing apparatus 10 is, for example, a personal computer (hereinafter referred to as "PC"), a tablet PC, a smartphone, a mobile phone, or other devices. The information processing apparatus 10 may be a terminal device (for example, a tablet PC, a smartphone, a mobile phone, or the like) that can be carried by the user, or may be a device that is installed on a table or the like and used. The information processing apparatus 10 may be a smart speaker having a communication function, a microphone, and a speaker. The information processing apparatus 10 may be installed indoors (for example, a room floor, a ceiling, a table, or the like) or may be installed outdoors. Further, the information processing apparatus 10 may be a movable apparatus (for example, a self-propelled apparatus).

The biological information measuring device 12 includes a sensor, an electrode, and the like, and is configured to measure a user's biological information. Each biological information measuring device 12 may measure different types of biological information. Of course, a part or all of the biological information measuring devices 12 may be configured to measure the identical type of biological information. Each biological information measuring device 12 may be configured to measure one type of biological information or may be configured to measure a plurality of types of biological information.

The biological information measuring device 12 transmits the biological information measured by the own device, to the information processing apparatus 10. The biological information measuring device 12 may transmit the biological information to the information processing apparatus 10 every time the biological information is measured, or store the biological information and transmit the biological information to the information processing apparatus 10 at predetermined time intervals, or transmit the biological information to the information processing apparatus 10 at a timing designated by the user. The biological information measuring device 12 may receive the biological information measured by another biological information measuring device 12 from the other biological information measuring device 12, and transmit the biological information measured by the own device and the biological information measured by the other biological information measuring device 12, to the information processing apparatus 10.

The biological information measuring device 12 may analyze the biological information measured from the own device or another biological information measuring device, and transmit information indicating the analysis result to the information processing apparatus 10. For example, the biological information measuring device 12 may include a processor, and the processor may analyze the biological information. Of course, the analysis may be performed by the information processing apparatus 10.

The biological information measuring device 12 includes a battery, and may be driven by power supplied from the battery, or may be driven by receiving power supplied from the information processing apparatus 10.

The biological information measuring device 12 may be a wearable device that measures biological information by the entire biological information measuring device 12 being worn on a user. For example, the biological information measuring device 12 may be a device worn on the user's head, a hearable device worn on the user's ear, or a device worn on the user's arm, hand, wrist, or finger (for example, a wristwatch-type device), a device worn around the user's neck, or a device worn on the user's body or legs.

The biological information is various types of physiological information and anatomical information emitted from a user who is a living body. The category of the concept of biological information includes, for example, information indicating brain activity (for example, brain waves, cerebral blood flow, cerebral magnetic field signal, or the like), pulse rate, blood pressure, heart rate, electrocardiographic waveform, electromyographic waveform, eye movement, body temperature, amount of sweat, line of sight, voice, user's movement and the like. It is only an example of such biological information, and other types of physiological information or anatomical information may be used as the biological information. The biological information measuring device 12 may measure one piece of biological information among these pieces of biological information, or may measure a plurality of pieces of biological information.

Further, the category of the concept of biological information includes biopotential information indicating a potential measured from the living body. Examples of the category of the concept of biopotential information include brain waves which are the measurement result of the minute current generated by brain activity, an electrocardiogram which is the measurement result of a minute current generated with the heartbeat, an electromyogram which is the measurement result of the minute current generated by muscle activity, and a skin potential which is the measurement result of minute current generated in the skin. These are merely examples of biopotential information, and other types of biopotential information may be used.

The information processing apparatus 10 receives biological information from the biological information measuring device 12, and analyzes the biological information, stores the biological information, outputs the biological information, stores information indicating the analysis result of the biological information, and outputs information indicating the analysis result of the biological information. Of course, analysis of biological information may be performed by the biological information measuring device 12. Outputting the biological information includes, for example, displaying the biological information, outputting the biological information as voice information, and the like. Outputting information indicating the analysis result of the biological information includes, for example, displaying information indicating the analysis result, outputting the analysis result as voice information, and the like. The information processing apparatus 10 may transmit biological information and information indicating the analysis result to another apparatus.

The information processing apparatus 10 may include one or a plurality of biological information measuring devices 12. That is, one or a plurality of biological information measuring devices 12 may be incorporated into the information processing apparatus 10 to constitute one apparatus. The entire information processing apparatus 10 including one or a plurality of biological information measuring devices 12 may be worn by a user to measure biological information. That is, the information processing apparatus 10 may be a wearable apparatus. For example, the information processing apparatus 10 may be a device worn on the user's head, a hearable device worn on the user's ear, or a device worn on the user's arm, hand, wrist, or finger (for example, a wristwatch-type device), a device worn around the user's neck, or a device worn on the user's body or legs.

Of course, the information processing apparatus 10 and the biological information measuring device 12 may be separate devices. For example, the information processing apparatus 10 may be a smart speaker, and the biological information measuring device 12 may be a wearable device worn by a user.

The environment information measuring device 14 is configured to measure environment information related to the environment around the environment information measuring device 14. For example, the environment information measuring device 14 is a camera that is an imaging device, a microphone that collects sound waves, a temperature sensor that measures temperature, a humidity sensor that measures humidity, an odor sensor that measures odor, an illuminance sensor that measures brightness, an infrared sensor, or the like. One or a plurality of these sensors may be included in the information processing system as the environment information measuring device 14.

For example, the surroundings of the information processing apparatus 10 and other places are captured by the camera, and image data representing the surroundings and image data representing other places are generated. The image data may be moving image data or still image data. The image data captured by the camera corresponds to an example of environment information on an environment included in the capturing range of the camera. Further, the image data representing the user, generated by capturing the user with the camera, corresponds to an example of the biological information of the user. For example, the movement of the user, the body shape of the user, and the like detected from the image data correspond to an example of the biological information of the user. In that sense, the camera corresponds to an example of a biological information measuring device 12 that measures biological information of the user.

Sound around the microphone (for example, human voice or other sounds) is input to the microphone, and sound data is generated by the microphone. The sound data representing the sound input to the microphone corresponds to an example of environment information on the environment around the microphone. The sound data representing the user's voice input to the microphone corresponds to an example of the user's biological information. In that sense, the microphone corresponds to an example of a biological information measuring device 12 that measures biological information of the user.

Data measured by a temperature sensor, a humidity sensor, an odor sensor, an illuminance sensor, an infrared sensor, or the like corresponds to an example of environment information.

One or a plurality of environment information measuring devices 14 may be included in the information processing apparatus 10.

The device 16 is, for example, a PC, a tablet PC, a smartphone, a mobile phone, a robot (for example, a humanoid robot, a non-human animal robot, a cleaning robot, and other robots), a projector, a display device such as a liquid crystal display, a recording device, a playback device, an imaging device such as a camera, a refrigerator, a rice cooker, a microwave oven, a coffee maker, a vacuum cleaner, a washing machine, an air conditioner, a lighting device, a watch, a surveillance camera, an automobile, a motorcycle, aircraft (for example, unmanned aircraft (for example, drone)), a game machine, a gas range, a warm water washing toilet seat, a ventilation fan, a doorbell, an entrance monitor, an elevator, a door, a window, or various sensing devices (for example, a temperature sensor, a humidity sensor, a voltage sensor, a current sensor, or the like). The category of the concept of the device 16 may include general devices. For example, information device, video device, audio device, and other device may also be included in the category of the device 16 according to the present exemplary embodiment.

The device 16 includes a communication device that is a communication interface, a storage device that stores data, and a processor that controls the operation of the device 16. The device 16 may have a user interface. The device 16 may transmit device identification information for identifying the device 16 that is the own device to the information processing apparatus 10. The device identification information is, for example, the ID, name, model number, or address (for example, MAC address or IP address) of the device 16.

Hereinafter, the configuration of the information processing apparatus 10 will be described in detail.

The information processing apparatus 10 includes, for example, a communication device 18, a UI 20, a storage device 22, and a processor 24. The information processing apparatus 10 may include other configurations.

The communication device 18 is a communication interface, and has a function of transmitting data to other apparatuses and a function of receiving data transmitted from other apparatuses. The communication device 18 may have a wireless communication function or may have a wired communication function. The communication device 18 may communicate with other devices by using, for example, near field communication, or may communicate with other devices through a communication path such as a LAN or the Internet. For example, the communication device 18 receives the biological information transmitted from the biological information measuring device 12. The communication device 18 may transmit control information for controlling the operation of the biological information measuring device 12, to the biological information measuring device 12. Further, the communication device 18 receives the environment information transmitted from the environment information measuring device 14. The communication device 18 may transmit control information for controlling the operation of the environment information measuring device 14, to the environment information measuring device 14. Further, the communication device 18 transmits, to the device 16, control information for controlling the operation of the device 16. The communication device 18 may receive information transmitted from the device 16.

The UI 20 is a user interface, and includes a display device and an operation device. The display device is a liquid crystal display, an EL display, or the like. The operation device is a keyboard, input keys, an operation panel, or the like. The UI 20 may be a UI such as a touch panel that has both a display device and an operation device. In addition, a microphone may be included in the UI 20, and a speaker that emits sound may be included in the UI 20.

The storage device 22 is a device that constitutes one or a plurality of storage areas for storing various types of data. The storage device 22 is, for example, a hard disk drive, various memories (for example, RAM, DRAM, ROM, or the like), other storage devices (for example, an optical disk), or a combination thereof. One or a plurality of storage devices 22 are included in the information processing apparatus 10.

The storage device 22 stores management information. The management information is information for specifying the operation content of the device 16, based on the biological information measured from the user. For example, predetermined reference biological information and operation information indicating the operation content of the device 16 are associated with each other and registered in the management information. The reference biological information may be biological information that is assumed to be generated from a user who performs an operation associated with the reference biological information, or biological information that is assumed to be generated from a user who requests execution of the operation. It can be said that the reference biological information is information indicating the operation content of the device 16. For each user, the reference biological information and the operation information may be associated with each other and registered in the management information.

The processor 24 is configured to receive the biopotential information of each of the plurality of users, and transmit to the device 16, control information indicating the operation content determined by comparing the operation contents of the device 16, the operation contents being recognized from biopotential information of the plurality of users. More specifically, the processor 24 receives biopotential information of each of a plurality of users, and recognizes the operation contents of the device 16 from the biopotential information of each of the plurality of users.

The processor 24 compares the biological information recognized from the biopotential information of each user to determine the operation content for the device 16, and transmits, to the device 16, the operation information indicating the determined operation content. The device 16 that has received the control information operates according to the control information. In this way, the processor 24 operates the device 16.

For example, a brain machine interface may be constructed by the biological information measuring device 12 that measures brain activity and the information processing apparatus 10. The brain machine interface method may be invasive or non-invasive. In this case, the processor 24 operates the device 16 based on the user's brain activity (for example, brain waves). In order to operate the device 16, the processor 24 may extract a characteristic component from the brain wave, and operate the device 16 based on the extracted component. In order to extract characteristic components from the brain wave, Fast Fourier Transform (FFT), Wavelet Transform (WT), Time Frequency Distribution (TFD), Eigenvector Methods (EM), autoregressive model (ARM) or the like may be used. In addition, as a method for linking the brain wave and the operation content of the device 16 using the feature vector obtained by the feature extraction, for example, independent component analysis (ICA), k-average method, support vector machine (SVM), a convolutional neural network, or the like may be used.

Further, the processor 24 is configured to receive the device identification information transmitted from the device 16 and identify the device 16. For example, the processor 24 transmits, to the device 16, a device identification information acquisition request, and acquires the device identification information transmitted from the device 16 in response to the acquisition request. Further, device identification information is transmitted to the information processing apparatus 10 from the device 16 that can communicate with the information processing apparatus 10 by being connected to the information processing apparatus 10, and the processor 24 may receive the device identification information that has been transmitted in this manner.

The processor 24 is configured to control the operation of each unit of the information processing apparatus 10. The processor 24 may include a memory.

Figure 3:
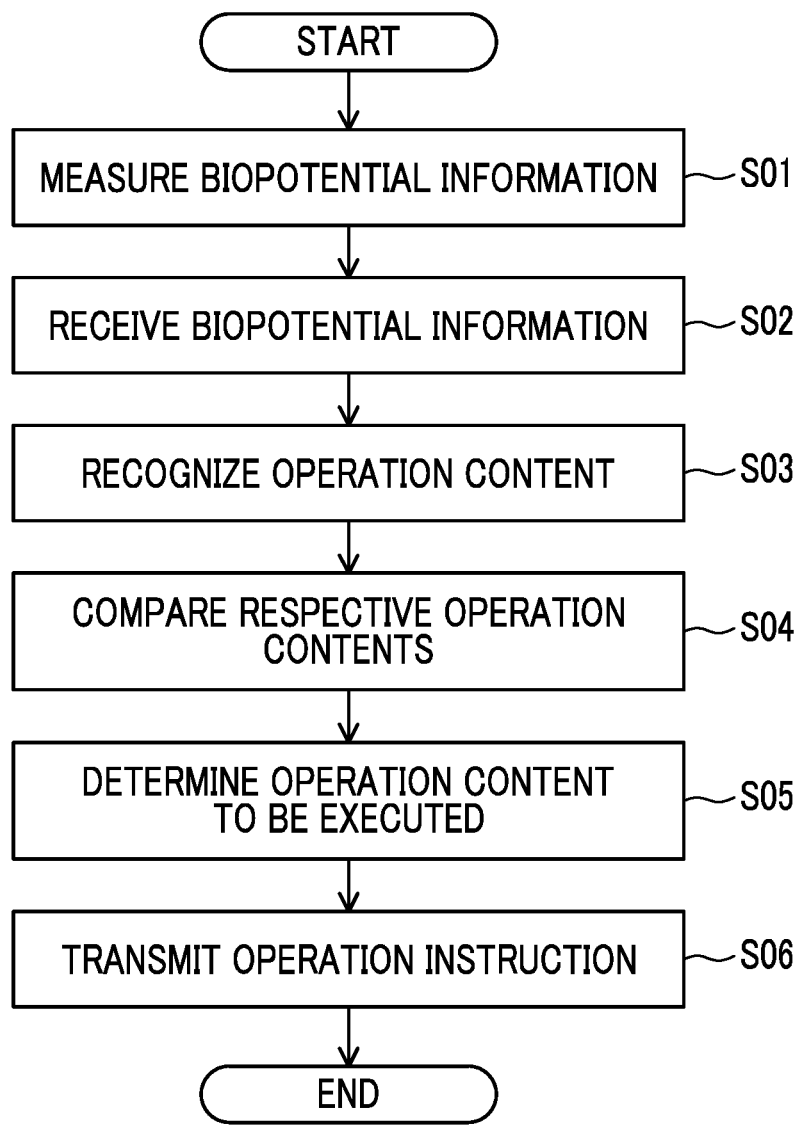
FIG. 3 is a flowchart showing a process by the information processing apparatus according to the present exemplary embodiment.

Hereinafter, the processing by the information processing apparatus 10 will be described in detail with reference to FIG. 3.

First, since a plurality of biological information measuring devices 12 are used, the biopotential information of each of a plurality of users is measured (S01). For example, the biological information measuring device 12 is worn by each user, and biopotential information of each user is measured. The biopotential information measured from each user is transmitted to the information processing apparatus 10. Note that biological information other than the biopotential information may also be measured and transmitted to the information processing apparatus 10.

The processor 24 receives the biopotential information of each user transmitted from each biological information measuring device 12 (S02). In a case where biological information other than biopotential information is also measured, the processor 24 also receives biological information other than biopotential information.

Next, the processor 24 recognizes the operation content of the device 16, for each user, based on the biopotential information measured from the user (S03).

For example, the processor 24 compares the biopotential information measured from the user with each piece of reference biological information registered in the management information described above, and searches for reference biological information whose difference from the biopotential information measured from the user is included in the allowable range. The processor 24 specifies the operation content associated with the searched reference biological information. The processor 24 specifies the operation content for each user.

In a case where a plurality of pieces of reference biological information whose difference from the biopotential information measured from the user is included within the allowable range are searched, the processor 24 specifies reference biological information whose difference from the biopotential information measured from the user is minimum, from among the plurality of pieces of reference biological information. The processor 24 specifies the operation content associated with the specified reference biological information. The allowable range is determined in advance. The allowable range may be changed by the user.

The reference biological information may be information indicating characteristic components of the biological information. In this case, the processor 24 may extract a characteristic component from the biopotential information measured from the user, and search for reference biological information whose difference from the extracted component is within an allowable range.

For example, in a case where a brain wave is used as the biopotential information, the processor 24 may estimate the operation content indicated by the brain wave, by extracting a characteristic component from the measured brain wave and analyzing the component.

For example, the processor 24 may recognize each operation content based on each biopotential information, for a plurality of pieces of biopotential information received within a predetermined time. For example, the processor 24 recognizes each operation content based on each biopotential information, for a plurality of pieces of biopotential information received within the period, for each predetermined period. The period may be changed by the user. As a specific example, the processor 24 recognizes each operation content based on each biopotential information, for a plurality of pieces of biopotential information received within 30 seconds every 30 seconds. The processor 24 repeats this process.

As another example, in a case of receiving biopotential information of a certain user, the processor 24 may recognize each operation content, based on each biopotential information, for the biopotential information and the biopotential information of one or a plurality of other users, received until a predetermined time elapses from a point of time at which the biopotential information has received. After the time has elapsed, in a case where the processor 24 receives biopotential information of a certain user, the processor 24 recognizes each operation content, based on each biopotential information, for the biopotential information and the biopotential information of one or a plurality of other users, received until a predetermined time elapses from a point of time at which the biopotential information has received. For example, the processor 24 repeats this process.

Next, the processor 24 compares operation contents recognized from the biopotential information of the plurality of users (S04), and determines the operation contents to be executed based on the comparison result (S05). The processor 24 operates the device 16 by transmitting operation information indicating the determined operation content to the device 16 to be operated (S06). A method of specifying the operation content to be executed will be described in detail later as an example.

In a case where only the biological information of one user is received, the processor 24 recognizes the operation content based on the biological information of the user, and operates the device 16 by transmitting the operation information indicating the operation content to the device 16 to be operated. The biological information may be biopotential information, may be other biological information other than biopotential information, or may be a combination of biopotential information and other biological information.

Hereinafter, as a specific example, the operation of the information processing system according to the present exemplary embodiment will be described.

FIG. 4 shows an example of a management table that is an example of management information. Data of the management table is stored in the storage device 22. The data of the management table may be stored in an external device such as a server without being stored in the storage device 22.

In the management table, an ID, a reference brain wave, and operation information indicating the operation content of the device 16 are associated in advance. The reference brain wave is an example of reference biological information. The reference brain wave is an example of biopotential information. The reference brain wave may be a reference brain wave that is assumed to be generated from a user who performs an operation associated with the brain wave, or brain wave that is assumed to be generated from a user who requests execution of the operation. Here, brain waves are used as an example of biopotential information, but biopotential information other than brain waves may be used.

The ID is information for managing information registered in the management table. The reference brain wave is, for example, a brain wave that is determined by statistical processing and is assumed to be generally generated from a user who performs an operation associated with the reference brain wave, or a brain wave that is assumed to be generally generated from a user who requests execution of the operation. The operation information includes device identification information for identifying the device 16 to be operated, and information indicating the operation content performed on the device 16.

For example, the reference brain wave associated with the ID "1" is a brain wave representing an operation content of turning on the cooling of the air conditioner. The reference brain wave associated with the ID "2" is a brain wave representing an operation content of turning off the cooling of the air conditioner.

For example, in a case where a brain wave of which difference from a reference brain wave associated with ID "1" is within an allowable range is measured from the user, the processor 24 specifies the operation content of "turning on the cooling of the air conditioner" associated with the reference brain wave. For example, in a case where only the brain wave of one user are measured and the difference between the brain wave and the reference brain wave associated with the ID "1" is within an allowable range, the processor 24 transmits the operation information indicating the operation content of "turning on the cooling of the air conditioner" to the "air conditioner" that is the device 16 to turn on the cooling of the "air conditioner".

Further, the processor 24 may calculate the similarity between the brain wave measured from the user and the reference brain wave, and may determine whether or not the similarity is equal to or greater than a threshold. The threshold is a value corresponding to the allowable range. In a case where the similarity between the two waveforms is equal to or greater than the threshold, the processor 24 determines that the two waveforms are similar, and determines that the difference between the brain wave measured from the user and the reference brain wave is included in an allowable range. That is, in a case where a brain wave whose similarity with the reference brain wave associated with the ID "1" is greater than or equal to the threshold is measured from the user, the processor 24 specifies the operation content of "turning on the cooling of the air conditioner".

The operation information may include information indicating the operation content related to the performance item of the device 16. The performance item is an item related to the performance of the device 16. The operation content related to the performance item is, for example, the operation content related to the performance level for the performance item. For example, an item relating to the set temperature of the "air conditioner" that is the device 16, an item relating to the air volume, an item relating to the air direction, an item relating to the presence or absence of the dehumidifying function, and the like are examples of performance items of the "air conditioner". A specific value of the set temperature, a specific value of the air volume, a specific direction of the wind, and the presence or absence of a dehumidifying function are examples of the performance level.

For example, the operation information for "air conditioner" may include information indicating the operation content related to performance items such as the set temperature and the air volume. For example, the operation information including information indicating the set temperature of the "air conditioner" and the reference brain wave indicating the set temperature may be associated and registered in the management table. For each set temperature, the operation information including information indicating the set temperature and the reference brain wave may be associated and registered in the management table. For example, in a case where a brain wave of which difference from a reference brain wave associated with operation information including information indicating a certain set temperature is included within an allowable range is measured from the user, the processor 24 sets the set temperature of the "air conditioner" to a set temperature associated with the reference brain wave. The same applies to the air volume.

For each user, the reference biological information and the operation information may be associated with each other and registered in the management table. For example, biopotential information measured from the user may be registered in the management table as the reference biological information of the user.

FIG. 5 shows an example of a management table in which specific reference biological information of each user is registered. In the management table illustrated in FIG. 5, an ID, a reference brain wave that is an example of reference biological information, operation information, and user information are associated are with each other. User information is information (for example, a user name, a user ID, or the like) for identifying a user.

The reference brain wave associated with the user information is a brain wave measured from the user when the user indicated by the user information performs an operation indicated by the operation information associated with the reference brain wave, or a brain wave measured from the user when the user requests the operation. A reference brain wave representing each operation measured from each user is measured in advance from each user and registered in the management table.

For example, when the user A manually turns on the cooling of the "air conditioner", the brain wave of the user A are measured by the biological information measuring device 12, and the measured brain wave is registered in the management table as a reference brain wave representing the operation content of the user A turning on the cooling of the "air conditioner". In this case, the measured reference brain wave of the user A, the operation information indicating the operation content for turning on the cooling of the "air conditioner", and the user information for identifying the user A are associated with each other and registered in the management table. The registration work may be performed using the information processing apparatus 10 or may be performed using another apparatus. In the example shown in FIG. 5, these pieces of information are registered as information of ID "1". The same applies to other operations and other users.

The registration work may be performed a plurality of times, and an average of a plurality of brain waves measured thereby may be registered as a reference brain wave. For example, the user A manually turns on the cooling of the "air conditioner", a work of measuring the brain wave generated from the user A at that time by the biological information measuring device 12 is performed a plurality of times, and the average of a plurality of brain waves measured by this work may be registered in the management table as a reference brain wave.

For example, in a state where only the user A logs in to the information processing apparatus 10, in a case where a brain wave having the difference from the reference brain wave associated with the ID "1" being within an allowable range is measured from the user A, the processor 24 transmits the operation information associated with the ID "1" to the "air conditioner" to turn on the cooling of the "air conditioner". In more detail, when only the user A is logged in to the information processing apparatus 10, in a case where the brain wave is measured by the biological information measuring device 12, the processor 24 searches for the reference brain wave associated with the user information for identifying the user A who logs in and registered in the management table. In the example shown in FIG. 5, since the reference brain wave associated with ID "1" and the reference brain wave associated with ID "3" are registered in the management table as the reference brain wave of user A, these reference brain wave are searched. In a case where the difference between the measured brain wave and the reference brain wave associated with ID "1" is within the allowable range, the processor 24 transmits the operation information associated with ID "1" to "air conditioner" to turn on the cooling of the "air conditioner". In a case where the difference between the measured brain wave and the reference brain wave associated with ID "3" is within the allowable range, the processor 24 transmits the operation information associated with ID "3" to "air conditioner" to turn off the cooling of the "air conditioner".

As another example, in a state where the user operating the device 16 is set as "user A" in the information processing apparatus 10, in a case where the reference brain wave associated with the ID "1" is measured from the user A, the processor 24 may turn on the power of the "air conditioner" by transmitting the operation information associated with the ID "1" to the "air conditioner". In more detail, in a case where a brain wave is measured by the biological information measuring device 12 in a state where "user A" is set as a user operating the device 16 in the information processing apparatus 10, the processor 24 searches for the reference brain wave associated with the user information for identifying the user A who is operating the device 16 and registered in the management table. In a case where the difference between the measured brain wave and the reference brain wave associated with ID "1" is within the allowable range, the processor 24 transmits the operation information associated with ID "1" to "air conditioner" to turn on the cooling of the "air conditioner". A user who operates the device 16 is set in the information processing apparatus 10 by the user, for example.

As for the user other than the user A, similar to the user A, each information is registered in the management table. For example, each piece of information associated with the ID "2" is information regarding an operation when the user B turns on the cooling of the "air conditioner". Each piece of information associated with the ID "3" is information regarding an operation when the user A turns off the cooling of the "air conditioner".

Hereinafter, each example will be described. In the following, it is assumed that the biological information measuring devices 12A, 12B, 12C, and 12D are devices that measure a brain wave that is an example of biopotential information. Further, another biological information measuring device 12 that measures biological information (for example, body temperature, or the like) other than the brain waves may be included in the information processing system.

The biological information measuring device 12A measures the brain waves of the user A by being worn by the user. The biological information measuring device 12B measures the brain waves of the user B by being worn by the user. The biological information measuring device 12C measures the brain waves of the user C by being worn by the user. The biological information measuring device 12D measures the brain waves of the user D by being worn by the user.

The biopotential information of a plurality of users may be the identical type of information or different types of information. For example, the biopotential information of a plurality of users is brain waves.

Example 1

In Example 1, as a result of comparing operation contents recognized from the biopotential information of the plurality of users, in a case where the operation contents match each other, the processor 24 specifies the matching operation contents as the operation contents to be executed. The processor 24 operates the device 16 by transmitting operation information indicating the matching operation content to the device 16 to be operated.

For example, in a case where the operation content of turning on the cooling of the "air conditioner" is recognized from the brain waves of the users A, B, C, and D, the operation contents match each other. In this case, the processor 24 turns on the cooling of the "air conditioner" by transmitting operation information indicating the operation content of turning on the cooling of the "air conditioner" to the "air conditioner". By doing so, an operation reflecting the requests of all users is performed.

For example, in a case where operation contents recognized from brain waves of the users A, B, C, and D measured within a predetermined period match each other, the processor 24 operates the device 16 by transmitting operation information indicating the matching operation content to the device 16 to be operated. For example, the processor 24 determines whether or not respective operation contents match each other, every period.

As another specific example, when projecting materials with a projector in a conference room, in a case where a brain wave representing an instruction to turn off the lighting device that illuminates the location where the material is projected is measured, from a plurality of users who feels that the lighting is bright and the materials are difficult to see, the processor 24 transmits operation information indicating a turn-off instruction to the lighting device, so the lighting device is turned off.

Example 2

In Example 2, as a result of comparing operation contents recognized from the biopotential information of the plurality of users, in a case where the operation contents do not match each other, the processor 24 determines operation contents to be executed according to a predetermined condition, and operates the device 16, by transmitting operation information indicating the determined operation contents to the device 16 to be operated. In a case where operation contents do not match each other, operation contents recognized from biopotential information of users do not match at all, or operation contents recognized from biopotential information of some users match each other but operation contents recognized from biopotential information of the other users do not match each other.

For example, in a case where the operation contents recognized from the brain waves of the users A, B, C, and D are different from each other, the processor 24 determines operation contents to be executed according to a predetermined condition. As another example, in a case where the operation contents recognized from the brain waves of the users A and B match each other, but the operation contents do not match the operation contents recognized from the brain waves of the users C and D, the processor 24 determines operation contents to be executed according to a predetermined condition.

Examples of a predetermined condition includes a condition for the number of users, a condition for attributes of the users, a condition for the environment around a plurality of users, or a condition for the performance items of the device 16. The attributes of the user is, for example, the gender, age, height, or weight of the user. The condition related to the attribute of the user is, for example, a priority determined based on the attribute of the user. The condition related to the performance item of the device 16 is, for example, a priority determined based on the performance item of the device 16. The environment is measured by the environment information measuring device 14.

For example, the processor 24 may determine the operation content to be executed by majority vote. For example, it is assumed that the operation contents recognized from the brain waves of the users A, B, and C are an operation content of turning on the cooling of the "air conditioner", and the operation content recognized from the brain wave of the user D is an operation content other than the operation content of turning on the cooling of the "air conditioner". Since the number of users whose brain waves representing the operation content of turning on the cooling of the "air conditioner" are measured is larger than the number of users whose brain waves representing the operation content other than the operation content are measured, the processor 24 determines the operation content of turning on the cooling of the "air conditioner" as the operation content to be executed, and turns on the cooling of the "air conditioner" by transmitting operation information indicating the operation content to the "air conditioner".

In the case where the operation contents of the majority and the operation contents of the minority contradict each other, the processor 24 may adjust the operation contents in a case where the number of minority users exceeds a threshold. For example, in a case where the operation content of the majority is an operation of changing a performance level in one direction, such as an operation of increasing the size of the text projected by the projector, an operation of increasing the brightness of the illumination, or an operation of increasing the volume of the speaker, the processor 24 executes the operation content of the majority. When the operation is being performed, in a case where the number of minority users who instruct operation content that contradicts the operation content of the majority (for example, an operation for reducing a text, an operation for darkening, or an operation for reducing the volume) is greater than or equal to the threshold, the processor 24 adjusts the operation content. For example, the processor 24 sets the text size to a medium size, sets the brightness to a medium brightness, and sets the speaker volume to a medium volume.

As another example, the priority of the operation content recognized from the biopotential information of each user may be determined based on the age of each user. For example, an operation content recognized from biopotential information measured from a child or an elderly person may be prioritized over an operation content recognized from biopotential information measured from a user other than the child or the elderly person. For example, user attribute information indicating an attribute of a user whose brain wave is measured by the biological information measuring device 12 is set in advance in the biological information measuring device 12. For example, a user whose age is equal to or lower than a predetermined lower limit age is set as a child, and a user whose age is equal to or higher than a predetermined upper limit age is set as an elderly person. For example, in a case where the operation content recognized from the biopotential information measured from a child or an elderly person is the operation content of turning off the cooling of the "air conditioner", even in a case where the operation content recognized from the biopotential information measured from other users is not the operation content of turning off the cooling of the "air conditioner", the processor 24 turns off the cooling of the "air conditioner" by transmitting operation information indicating the operation content of turning off the cooling of the "air conditioner" to the "air conditioner".

For example, it is assumed that the user A is a child or an elderly person, and the operation content recognized from the biopotential information of the user A is the operation content of turning off the cooling of the "air conditioner". In this case, even in a case where the biopotential information measured from each of the users B, C, and D is not the operation content for turning off the cooling of the "air conditioner", the processor 24 turns off the cooling of the "air conditioner".

Further, the processor 24 may perform weighting according to the age of the user. For example, the processor 24 increases the weight coefficient of the operation content recognized from the biopotential information of the older user, adds up the weight coefficients of the identical operation content, and determines the operation content with the largest total number of weight coefficients as the operation content to be executed. The weight coefficient may be changed stepwise according to age.

As another specific example, in places where an unspecified number of people are assumed to gather, such as trains, buses, and movie theaters, the operation content recognized from the biopotential information measured from children and elderly persons may be prioritized over the operation content recognized from biopotential information measured from users other than children and the elderly. In the case where it is assumed that specific persons gather, such as a living room in the house or a workplace, the processor 24 may operate the device 16 without depending on the priority based on the age.

As another example, the priority of the operation content recognized from the biopotential information of each user may be determined based on the gender of each user. Further, the priority of the operation content may be determined based on the gender of the user and the operation content. For example, regarding the operation of cooling the "air conditioner", the priority of the operation content recognized from the brain wave of woman is set higher than the priority of the operation content recognized from the brain wave of a man. For example, in a case where the operation content recognized from the biopotential information measured from a woman is the operation content of turning off the cooling of the "air conditioner", even in a case where the operation content recognized from the biopotential information measured from a man is not the operation content of turning off the cooling of the "air conditioner", the processor 24 turns off the cooling of the "air conditioner" by transmitting operation information indicating the operation content of turning off the cooling of the "air conditioner" to the "air conditioner".

Further, the processor 24 may perform weighting according to the gender of the user on the operation content recognized from the biopotential information of each user, add up the weight coefficients of the identical operation content, and determine the operation content with the largest total number of weight coefficients as the operation content to be executed.

As another example, in a case where the operation contents of the device 16, the operation contents being recognized from the biopotential information of a plurality of users, are to turn on or off the power of the device 16, in a case where the operation contents of the device 16, the operation contents being recognized from the biopotential information of the plurality of users, do not match each other, the processor 24 may transmit operation information for the operation contents of maintaining the power of the device 16 as it is to the device 16. For example, in a case where the operation contents recognized from the brain waves of the users A and B are an operation content of turning on the power of the "air conditioner", and the operation contents recognized from the brain waves of the users C and D are an operation content of turning off the power of the "air conditioner", the processor 24 maintains the power of the "air conditioner" as it is. In a case where the power of the "air conditioner" is on, the processor 24 maintains the power-on state. Even in this case, weighting according to the age and gender of the user may be performed.

As another example, in a case where the operation contents of the device 16, the operation contents being recognized from the biopotential information of a plurality of users, are to operate the performance level of the device 16, in a case where the operation contents of the device 16, the operation contents being recognized from the biopotential information of the plurality of users, do not match each other, the processor 24 may transmit operation information indicating a performance level determined according to the predetermined condition to the device 16.

For example, the processor 24 may determine the performance level by majority vote. For example, it is assumed that the operation contents recognized from the brain waves of the users A, B, and C are an operation content of setting the cooling set temperature of the "air conditioner" to 25° C., and the operation content recognized from the brain wave of the user D is an operation content of setting the cooling set temperature of the "air conditioner" to 28° C. Since the number of users whose brain waves representing the operation content of setting the cooling set temperature of the "air conditioner" to 25° C. is larger than the number of users whose brain waves representing the operation content other than the operation content is measured, the processor 24 determines the operation content of setting the cooling set temperature of the "air conditioner" to 25° C. as the operation content to be executed, and sets the cooling set temperature of the "air conditioner" to 25° C. by transmitting operation information indicating the operation content to the "air conditioner".

As another example, the priority of the performance level recognized from the biopotential information of each user may be determined based on the age of each user. For example, a performance level recognized from biopotential information measured from a child or an elderly person may be prioritized over a performance level recognized from biopotential information measured from a user other than the child or the elderly person. For example, in a case where the operation content recognized from the biopotential information measured from a child or an elderly person is the operation content of setting the cooling set temperature of the "air conditioner" to 28° C., even in a case where the operation content recognized from the biopotential information measured from other users is not the operation content of setting the cooling set temperature of the "air conditioner" to 28° C., the processor 24 sets the cooling set temperature of the "air conditioner" to 28° C., by transmitting the operation information of setting the cooling set temperature of the "air conditioner" to 28° C. to the "air conditioner". Weighting according to the age of the user may be performed.

As another example, the priority of the performance level recognized from the biopotential information of each user may be determined based on the gender of each user. Further, the priority of the performance level may be determined based on the user's gender and operation content. For example, regarding the cooling operation of the "air conditioner", the priority of the performance level recognized from the brain wave of a woman is set higher than the priority of the performance level recognized from the brain wave of a man. For example, in a case where the operation content recognized from the biopotential information measured from the woman is the operation content of setting the cooling set temperature of the "air conditioner" to 28° C., even in a case where the operation content recognized from the biopotential information measured from the man is not the operation content of setting the cooling set temperature of the "air conditioner" to 28° C., the processor 24 sets the cooling set temperature of the "air conditioner" to 28° C., by transmitting the operation information of setting the cooling set temperature of the "air conditioner" to 28° C. to the "air conditioner". Further, weighting according to the gender of the user may be performed.

Example 3

In Example 3, in a case where the operation content to be performed is the operation content that affects the state of the living body, the processor 24 operates the device 16, by transmitting operation information indicating the operation contents determined based on the environment around the plurality of users whose biopotential information is measured to the device 16.

For example, an air conditioner that changes the temperature the user or the surroundings of the user, an electric fan that sends wind to the user or the surroundings of the user, and the like are devices that execute operation contents that affect the state of the living body. The environment around the plurality of users is measured by the environment information measuring device 14. For example, the environment information measuring device 14 measures the temperature, humidity, atmospheric pressure, odor, air volume, air direction, and the like around a plurality of users.

For example, in a case where brain wave representing the operation content of turning on cooling of the air conditioner because it is hot and humid are measured from a plurality of users of a predetermined number or more who are in the identical room, the processor 24 determines the operation contents of the air conditioner which is the device 16, based on the temperature and humidity around the plurality of users, and transmits the operation information indicating the operation contents to the air conditioner to operate the air conditioner. For example, the operation content of the air conditioner for the combination of the ambient temperature and humidity (for example, the set temperature, air volume, and air direction that a person feels comfortable) is determined in advance, and information indicating these contents is stored in the storage device 22 or an external device. The processor 24 operates the air conditioner by transmitting operation information indicating the operation content for the combination of the ambient temperature and humidity to the air conditioner. For example, the processor 24 turns on cooling of the air conditioner, and sets the set temperature, air volume, and air direction of the air conditioner to the set temperature, air volume, and air direction for the combination of the ambient temperature and humidity.

Example 4

In Example 4, the processor 24 recognizes the state of the user, for each user, from the biopotential information, and outputs a warning to the user whose state is different from the states of the users of a predetermined number or more.

The category of the concept of the user state includes, for example, the user's emotion, mental state, psychological state, desire, physiological state, state related to the body (for example, state related to body function and organization), and the like.

For example, for each user state, information indicating the user state and biopotential information assumed to be generated from the user having the state are associated in advance, and these pieces of information are stored in the storage device 22 or the external device. The biopotential information may be information that is statistically assumed to be generated from a general user having the state, or information previously measured individually for each user from the user having the state. For example, for each user state, information indicating the user state and a brain wave assumed to be generated from the user having the state are associated with each other in advance. The processor 24 estimates the state of the user, based on the brain wave measured from the user, by referring to the information indicating the association between the information indicating the state of the user and the biopotential information. The processor 24 estimates the state of each user.

For example, in a case where a brain wave representing a hot and humid state is measured from a plurality of users of a predetermined number or more, among a plurality of users in the identical room, but a brain wave representing a cold state is measured from only one user among the plurality of users, the processor 24 outputs a warning to the user whose brain wave representing the cold state is measured. For example, the processor 24 may transmit a message such as "Are you feeling sick due to fever or the like?" to a terminal device (for example, a smartphone or a PC) possessed by the user, or emit a voice representing the message from a speaker.

Example 5

In Example 5, in a case where the operation content to be executed is an operation content that affects the state of the living body, the processor 24 receives one or a plurality of types of biological information different from the biopotential information from each of a plurality of users, recognizes whether the device 16 is driven based on the biopotential information, recognizes the performance level of the device 16 based on the biological information, and operates the device 16.

For example, in a case where brain waves representing the operation content of turning on cooling of the air conditioner because it is hot and humid are measured from a plurality of users of a predetermined number or more who are in the identical room, the processor 24 turns on cooling of the air conditioner. In addition, the biological information indicating the body temperature, blood pressure, pulse, and amount of sweat of each user is measured by the biological information measuring device 12, and the processor 24 determines the performance level such as the set temperature and the air volume of the air conditioner, based on the body temperature, blood pressure, pulse, and amount of sweat of each user. For example, the performance level of an air conditioner (for example, a set temperature, an air volume, an air direction, or the like that a person feels comfortable) for a combination of body temperature, blood pressure, pulse, and amount of sweat is determined in advance. Information indicating these contents is stored in the storage device 22 or an external device. The processor 24 calculates, for example, the average value of the body temperature, the average value of the blood pressure, the average value of the pulse, and the average value of the amounts sweat of a plurality of users, and sets the performance level of the air conditioner to the performance level for the combination of the average values by transmitting operation information indicating the performance level for the combination of these average values to the air conditioner. The body temperature, blood pressure, pulse, and amount of sweat are merely examples of biological information, and other types of biological information may be used, or some information of these biological information may be used.

Depending on the attribute of the user, the operation content recognized from the biological information different from the biopotential information may be prioritized over the operation content recognized from the biopotential information.

For example, in the above-described example, even in a case where brain waves representing that users do not feel hot and humid are measured from elderly persons included in the plurality of users, in a case where the body temperature, blood pressure, pulse, and amount of sweat measured from the elderly persons indicate the performance level such as the set temperature and air volume of the air conditioner, the processor 24 determines the performance level of the air conditioner including biological information such as body temperature, blood pressure, pulse, and amount of sweat measured from the elderly persons, and operates the air conditioner.

Example 6

In Example 6, the processor 24 determines the performance level of the device 16 to be operated, based on the environment around the plurality of users.

The environment around the plurality of users is measured by the environment information measuring device 14. For example, the environment information measuring device 14 measures the temperature, humidity, atmospheric pressure, odor, air volume, air direction, and the like around a plurality of users.

For example, in a case where brain waves representing the operation content of turning on cooling of the air conditioner because it is hot and humid are measured from a plurality of users of a predetermined number or more who are in the identical room, the processor 24 turns on cooling of the air conditioner. Further, the processor 24 determines the performance level such as the set temperature, the air volume, and the air direction of the air conditioner, based on the room temperature, humidity, room size, number of persons, and the like. The room temperature, humidity, room size, number of persons, and the like are the surrounding environment and are measured by the environment information measuring device 14. The room size and the number of persons are measured by each sensor or camera.

For example, the performance level of an air conditioner (for example, a set temperature, an air volume, an air direction, or the like that a person feels comfortable) for a combination of temperature, humidity, room size and number of persons is determined in advance. Information indicating these contents is stored in the storage device 22 or an external device. The processor 24 specifies the performance level for the combination of the ambient temperature, humidity, room size and number of persons, and sets the performance level of the air conditioner to the specified performance level by transmitting operation information indicating the performance level to the air conditioner.

Example 7

In Example 7, the processor 24 determines the performance level of the device 16 to be operated, based on the combination of the environment around the plurality of users and one or a plurality of types of biological information of each of the plurality of users.

For example, in a case where brain waves representing the operation content of turning on cooling of the air conditioner because it is hot and humid are measured from a plurality of users of a predetermined number or more who are in the identical room, the processor 24 turns on cooling of the air conditioner. Further, the processor 24 determines the performance level such as the set temperature, air volume, and air direction of the air conditioner, based on the combination of the room temperature, humidity, room size and number of persons, and the average value of the body temperature, the average value of the blood pressure, the average value of the pulse, and the average value of the amounts of sweat of a plurality of users.

For example, the performance level of an air conditioner (for example, a set temperature, an air volume, an air direction, or the like that a person feels comfortable) for a combination of temperature, humidity, room size and number of persons, and a user's body temperature, blood pressure, pulse, and amount of sweat is determined in advance. Information indicating these contents is stored in the storage device 22 or an external device. The processor 24 specifies the performance level for the combination of the ambient temperature, humidity, room size and number of persons, and the average value of the body temperature, the average value of the blood pressure, the average value of the pulse, and the average value of the amounts of sweat of a plurality of users, and sets the performance level of the air conditioner to the specified performance level by transmitting operation information indicating the performance level to the air conditioner.

Example 8

In Example 8, the processor 24 changes the performance level of the device 16, according to the magnitude of the biopotential indicated by the biopotential information. For example, the processor 24 changes the performance level of the device 16, according to the magnitude of the average value of the biopotential measured from a plurality of users.

For example, information indicating the magnitude of the biopotential and information indicating the performance level are associated with each device 16 and stored in the storage device 22. The processor 24 changes the performance level according to the magnitude of the biopotential by referring to the associated information. For example, the processor 24 changes the performance level of the device 16 according to the amplitude of the brain wave that is an example of the biopotential. Here, the amplitude of the brain wave is an average value of the amplitudes of the brain waves measured from a plurality of users. Further, weighting processing according to the attribute of the user may be performed on the amplitude of the brain wave, and an average value of the weighted amplitudes may be calculated.

For example, the processor 24 increases the performance level as the amplitude of the brain wave increases. For example, the processor 24 increases the volume of the speaker, increases the air volume of the air conditioner, decreases the cooling temperature, or increases the heating temperature as the amplitude of the brain wave increases. As another example, the processor 24 may change the performance level of the device 16, according to the magnitude of the peak of the brain wave, the magnitude of the period, or the like.

Example 9

In Example 9, the processor 24 changes the performance level of the device 16 according to the speed of a change in the biopotential indicated by the biopotential information.

For example, the processor 24 changes the performance level of the device 16, according to the average value of the change rate of the biopotential measured from a plurality of users.

For example, for each device 16, information indicating the speed of a change in the biopotential and information indicating the performance level are associated with each other and stored in the storage device 22. The processor 24 changes the performance level according to the speed of change in the biopotential by referring to the associated information. For example, the processor 24 changes the performance level of the device 16 according to the speed of a change in the amplitude of the brain wave, which is an example of the biopotential. Here, the speed of change in the amplitude of the brain wave is an average value of the speed of change in the amplitude of the brain waves measured from a plurality of users. Further, weighting processing according to the attribute of the user may be performed on the speed of a change in the amplitude of the brain wave, and an average value of the weighted change speeds may be calculated.

For example, the processor 24 improves the performance level as the amplitude of the brain wave changes fast. For example, the processor 24 increases the volume of the speaker, increases the air volume of the air conditioner, lowers the cooling temperature, or raises the heating temperature, as the amplitude of the brain wave changes fast. As another example, the processor 24 may change the performance level of the device 16 according to the speed of change in the peak of the brain wave, the speed of change in the period, or the like.

Example 10

In Example 10, the processor 24 changes the performance level of the device 16 according to the amount of change in the biopotential indicated by the biopotential information. For example, the processor 24 changes the performance level of the device 16, according to the average value of the change amount of the biopotential measured from a plurality of users.

For example, for each device 16, information indicating the amount of change in biopotential and information indicating the performance level are associated with each other and stored in the storage device 22. The processor 24 changes the performance level according to the change amount of the biopotential by referring to the associated information. For example, the processor 24 changes the performance level of the device 16 according to the amount of change in the amplitude of the brain wave that is an example of the biopotential. Here, the amount of change in the amplitude of the brain wave is an average value of the amount of change in the amplitude of the brain waves measured from a plurality of users. Further, weighting processing according to the attribute of the user may be performed on the amount of change in the amplitude of the brain wave, and an average value of the weighted change amounts may be calculated.

For example, the processor 24 improves the performance level as the amount of change in the amplitude of the brain wave increases. For example, the processor 24 increases the volume of the speaker, increases the air volume of the air conditioner, lowers the cooling temperature or raises the heating temperature, as the amount of change in the amplitude of the brain wave increases. As another example, the processor 24 may change the performance level of the device 16, according to the amount of change in the peak of the brain wave, the amount of change in the period, or the like.

Example 11

In Example 11, in a case where a plurality of operation instructions are given to the device 16 according to the biopotential information, the processor 24 operates the device 16, by transmitting operation information indicating the operation content to the device 16 according to a predetermined priority.

For example, in a case where an operation content (hereinafter referred to as "first operation content") indicated by a plurality of pieces of biopotential information measured from a plurality of users of a predetermined number or more and an operation content (hereinafter referred to as "second operation content") indicated by other plurality of pieces of biopotential information measured from a plurality of users of a predetermined number or more are different, these operation contents may be the operation contents for the identical device 16. In this case, the processor 24 operates the device 16 by transmitting operation information indicating the operation content to the device 16, according to a predetermined priority.

For example, the priority may be determined based on the operation content, may be determined based on the type of biopotential information, or may be determined based on the attribute of the user whose biopotential information is measured. The priority may be set by the user.

For example, the processor 24 operates the device 16 by transmitting operation information indicating the operation content having a high priority to the device 16, and does not transmit operation information indicating the operation content having a low priority to the device 16. In a case where the priority of the first operation content is higher than the priority of the second operation content, the processor 24 operates the device 16 by transmitting operation information indicating the first operation content to the device 16. In this case, the processor 24 does not transmit operation information indicating the second operation content to the device 16.

For example, the priority of a brain wave is set to the highest priority, and the priority of pulse is set to the second highest priority. In a case where the first operation content is specified based on the brain wave and the second operation content is specified based on the pulse, the processor 24 operates the device 16 by transmitting, to the device 16, operation information indicating the first operation content specified based on the brain wave having a high priority. In this case, the processor 24 does not transmit, to the device 16, operation information indicating the second operation content specified based on the pulse having a low priority.

Example 12

In Example 12, in a case where the processor 24 receives a plurality of pieces of pieces of biopotential information with which different operation contents are recognized within a predetermined time, the processor 24 operates the device 16, by transmitting operation information indicating the operation content to the device 16 according to a predetermined priority.

For example, within a predetermined time from a point of time at which a plurality of pieces of biopotential information indicating the first operation content are measured from a plurality of users having a predetermined number or more, a plurality of pieces of biopotential information indicating a second operation content different from the first operation content may be measured from a plurality of other users of a predetermined number or more. In this case, the processor 24 transmits operation information indicating the operation content to the device 16, according to a predetermined priority. The device 16 that is the operation target of the second operation content is the device 16 that is the operation target of the first operation content. For example, the priority is determined in the identical manner as the priority according to Example 11.

Example 13

In Example 13, in a case of receiving a plurality of pieces of biopotential information with which different operation contents are recognized within a predetermined time, the processor 24 operates the device 16 by transmitting the operation information indicating the operation content recognized from the biopotential information of the largest number of users to the device 16.

For example, in the example described in Example 12, the number of users whose a plurality of pieces of biopotential information indicating the first operation content is measured is larger than the number of users whose a plurality of pieces of biopotential information indicating the second operation content is measured, the processor 24 operates the device 16 by transmitting operation information indicating the first operation content to the device 16. In this case, the processor 24 does not transmit operation information indicating the second operation content to the device 16. Further, the device 16 that is the operation target of the second operation content is the device 16 that is the operation target of the first operation content.

In a case where the number of users whose a plurality of pieces of biopotential information indicating the first operation content are measured is identical to the number of users whose a plurality of pieces of biopotential information indicating the second operation content are measured, the processor 24 operates the device 16 by transmitting operation information indicating the first operation content or the second operation content to the device 16, according to the predetermined priority.

Example 14

In Example 14, in a case of receiving a plurality of pieces of biopotential information with which different operation contents are recognized, within a predetermined time, the processor 24 operates the device 16 by transmitting the operation information indicating the operation content recognized from the biopotential information having the highest occurrence frequency to the device 16. The occurrence frequency is, for example, the number of occurrences from the user within a predetermined period.

For example, in the example described in Example 12, the occurrence frequency of a plurality of pieces of biopotential information indicating the first operation content is higher than the occurrence frequency of a plurality of pieces of biopotential information indicating the second operation content, the processor 24 operates the device 16 by transmitting operation information indicating the first operation content to the device 16. In this case, the processor 24 does not transmit operation information indicating the second operation content to the device 16.

For example, the identical user may emit biopotential information indicating the identical operation content a plurality of times within a predetermined time, and it is estimated that the greater the number of times, the higher the request for the operation. Therefore, the processor 24 operates the device 16 by transmitting operation information indicating the operation content recognized from the biopotential information having the highest occurrence frequency to the device 16.

For example, the processor 24 counts the number of times the identical biopotential information is measured from each user within a predetermined time, and calculates the occurrence frequency of each biopotential information. Then, the processor 24 specifies the operation content recognized from the biopotential information with the highest occurrence frequency.

Example 15

In Example 15, in a case of receiving a plurality of pieces of biopotential information with which different operation contents are recognized within a predetermined time, the processor 24 operates the device 16 by transmitting the operation information indicating the operation content according to the relationship between the positions of the respective users whose biopotential information is measured, to the device 16.

For example, in a case where the speaker that is the device 16 is a device to be operated, the processor 24 sets the speaker volume by transmitting to the speaker, operation information indicating the operation content related to the set sound volume according to the relationship between the position of the speaker and the position of each user. For example, the processor 24 sets the speaker volume to such a volume that the user who is closest to the speaker does not feel noisy and the user who is farthest from the speaker can hear the sound.

For example, the processor 24 may set the volume of the speaker according to a case study performed in advance. For example, for each set volume of the speaker, information indicating the set volume of the speaker and information indicating the volume measured at each position with respect to the position of the speaker when the set volume is emitted from the speaker are associated with each other in advance and stored in the storage device 22. The processor 24 sets the volume corresponding to the position of each user in the speaker by referring to the association.

As another example, the processor 24 may adjust the volume of the speaker while receiving biopotential information of each user. For example, the processor 24 sets in the speaker, the volume at which biopotential information representing a feeling that the sound is loud is not measured from the user closest to the speaker, and biopotential information representing a feeling of hearing a sound is measured from the user farthest from the speaker.

Example 16

In Example 16, the processor 24 operates the device 16 such that the device 16 to be operated preferentially acts on the user who is assumed to be most affected by a biological state recognized from the biological information of the user.

For example, in a case where cooling of the air conditioner that is the device 16 is turned on, the processor 24 sets the air direction of the air conditioner such that the air from the air conditioner hits the user having a high body temperature for a longer time than the user having a low body temperature. A user with a high body temperature is assumed to be more affected by cooling than a user with a low body temperature. Therefore, the processor 24 sets the air direction of the air conditioner such that the air from the air conditioner hits the user with high body temperature for a longer time such that the air conditioner preferentially acts on the user with high body temperature.

Example 17

In Example 17, the processor 24 performs an operation on each performance item of the device 16, the operation contents being recognized from the biopotential information of the user, on the device 16 according to the priority of each performance item.

For example, the priority of each performance item of the device 16 is determined in advance for each device 16. For example, when a performance item of the device 16 is operated, a performance item whose operation time until acting around the device 16 after start of the operation is longer has a higher priority. In other words, the performance item acting slower on the surroundings has a higher priority.

For example, the processor 24 transmits the operation information indicating the operation content related to the performance item having a higher priority to the device 16 earlier than the operation information indicating the operation content related to the performance item having a lower priority, so the processor 24 performs the operation related to the performance item having a higher priority earlier than the operation related to the performance item having a lower priority.

With the operation of the air conditioner as an example, priorities are set in advance for setting items such as the set temperature, air volume, air direction and dehumidifying function of the air conditioner. For example, the set temperature or the dehumidifying function is a performance item having a longer time until acting around the air conditioner after start of the operation. That is, even in a case where an operation for changing the set temperature is performed, the temperature around the air conditioner does not immediately become the set temperature, and a certain amount of time is required until the temperature around the air conditioner becomes the set temperature. Similarly, even in a case where an operation to turn on the dehumidifying function is performed, it is not immediately dehumidified until the humidity around the air conditioner reaches the set humidity, and a certain amount of time is required until the surroundings of the air conditioner is dehumidified. On the other hand, the air volume and the air direction are performance items having a shorter time until acting around the air conditioner after start of the operation. That is, in a case where an operation for changing the air volume is performed, the air volume of the air conditioner is immediately changed to the air volume after the change. The same applies to the air direction. Thus, the time required to act around the air conditioner varies depending on the performance item.

For example, the priority of setting items such as set temperature and dehumidifying function is higher than the priority of setting items such as air volume and direction. In this case, the processor 24 performs an operation related to the setting of the set temperature with a high priority and an operation related to the on/off of the dehumidifying function before the operations related to the setting of the air volume and the air direction with a low priority.

Note that operations related to performance items such as the set temperature, air volume, air direction, and dehumidifying function of the air conditioner are recognized from the biopotential information or other types of biological information of the user. For example, the set temperature or the like is recognized from biopotential information or other biological information measured from a plurality of users of a predetermined number or more. The same applies to the other examples.

Example 18

In Example 18, the processor 24 recognizes the state of the user, for each user, based on other biological information different from the biopotential information. In a case where the state of at least one user among the plurality of users is different from a predetermined normal state, the processor 24 stops the operation of the information processing apparatus 10. For example, in a case where the difference between the user's body temperature and the body temperature in the normal state (for example, normal heat) is equal to or greater than the threshold, the processor 24 determines that the user's state is different from the normal state, and stops the operation of the information processing apparatus 10. Thereby, operation of the device 16 based on biological information is no longer performed. The processor 24 may determine whether or not the user's state is a normal state based on the user's pulse and blood pressure.

OTHER EXAMPLES

According to the attributes of the users, the processor may use biological information (for example, body temperature) other than the biopotential information instead of the biopotential information (for example, brain waves) of the user, as a determination material for determining the operation content of the device 16. For example, the processor may determine the operation content, based on body temperature or the like instead of the brain wave, for a user with low brain wave sensitivity.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive biopotential information of each of a plurality of users; and
transmit, to a device, operation information indicating operation content determined by comparing the operation contents of the device, the operation contents being recognized from the biopotential information of the plurality of users,
wherein in a case where the processor receives a plurality of pieces of biopotential information with which different operation contents are recognized within a predetermined time, the processor transmits, to the device, operation information indicating the operation content recognized from the biopotential information having a highest occurrence frequency.

2. The information processing apparatus according to claim 1, wherein in a case where the operation content indicated by the operation information is an operation content that affects a state of a living body, the processor transmits, to the device, the operation information indicating an operation content determined based on environment information around the plurality of users to the device.

3. The information processing apparatus according to claim 1, wherein for each user, a state of the user is recognized from the biopotential information, and the processor further outputs a warning to the user whose state is different from the states of the users of a predetermined number or more.

4. The information processing apparatus according to claim 1, wherein the biopotential information of the plurality of users is identical type information.

5. The information processing apparatus according to claim 1, wherein the biopotential information is brain waves.

6. The information processing apparatus according to claim 1, wherein in a case where the operation content indicated by the operation information is an operation content that affects a state of a living body, the processor further receives one or a plurality of types of biological information, which are measured from the plurality of users, and different from the biopotential information, recognizes whether the device is driven, based on the biopotential information, recognizes a performance level of the device, based on the biological information, and operates the device.

7. The information processing apparatus according to claim 6, wherein according to an attribute of the user, the operation content recognized from the biological information different from the biopotential information is prioritized over the operation content recognized from the biopotential information.

8. An information processing apparatus comprising:
a processor configured to:
receive biopotential information of each of a plurality of users; and
transmit, to a device, operation information indicating operation content determined by comparing the operation contents of the device, the operation contents being recognized from the biopotential information of the plurality of users,
wherein in a case where the processor receives a plurality of pieces of biopotential information with which different operation contents are recognized within a predetermined time, the processor transmits, to the device, operation information indicating the operation content according to a positional relationship of each user.

9. The information processing apparatus according to claim 8, wherein the processor determines a performance level of the device, based on environment information around the plurality of users.

10. The information processing apparatus according to claim 8, wherein the processor further determines a performance level of the device, based on a combination of environment information around the plurality of users and one or a plurality of types of biological information of each of the plurality of users.

11. The information processing apparatus according to claim 8, wherein the processor further changes a performance level of the device according to a magnitude of a biopotential indicated by the biopotential information.

12. The information processing apparatus according to claim 8, wherein the processor further changes a performance level of the device according to a speed of a change in a biopotential indicated by the biopotential information.

13. The information processing apparatus according to claim 8, wherein the processor further changes a performance level of the device according to a change amount of a biopotential indicated by the biopotential information.

14. The information processing apparatus according to claim 8, wherein in a case where a plurality of operation instructions are given to the device, the processor transmits operation information indicating operation contents to the device, according to a predetermined priority.

15. An information processing apparatus comprising:
a processor configured to:
receive biopotential information of each of a plurality of users; and
transmit, to a device, operation information indicating operation content determined by comparing the operation contents of the device, the operation contents being recognized from the biopotential information of the plurality of users,
wherein when the operation contents being recognized from the biopotential information of the plurality of users match each other, the processor transmits the operation information to the device, and wherein when the operation contents being recognized from the biopotential information of the plurality of users do not match each other, the processor transmits the operation information indicating operation contents determined according to a predetermined condition to the device.

16. The information processing apparatus according to claim 15, wherein in a case where the operation contents of the device, the operation contents being recognized from the biopotential information of the plurality of users, are to turn on or off a power of the device, and the operation contents of the device, the operation contents being recognized from biopotential information of the plurality of users, do not match each other, the processor transmits the operation information having a content of maintaining the power of the device as it is, to the device.

17. The information processing apparatus according to claim 15, wherein in a case where the operation contents of the device, the operation contents being recognized from the biopotential information of the plurality of users, are to operate a performance level of the device, and the operation contents of the device, the operation contents being recognized from biopotential information of the plurality of users, do not match each other, the processor transmits the operation information indicating a performance level determined according to a predetermined condition to the device.

18. The information processing apparatus according to claim 15, wherein predetermined condition includes at least one of: a condition for the number of users, a condition for attributes of the users, a condition for the environment around a plurality of users, or a condition for the performance items of the device.

19. The information processing apparatus according to claim 15, wherein in a case where the processor receives a plurality of pieces of biopotential information with which different operation contents are recognized, within a predetermined time, the processor transmits, to the device, operation information indicating the operation content recognized from the biopotential information of the largest number of users.

20. The information processing apparatus according to claim 15, wherein the processor further performs an operation for each performance item of the device, which is recognized from the biopotential information, on the device, according to a priority of each performance item of the device.

\* \* \* \* \*